Oct. 16, 1923.

B. KATZ 1,471,168

HEADREST FOR AUTOMOBILE SEATS AND THE LIKE

Filed Feb. 24, 1921

INVENTOR
BENJAMIN KATZ
BY
Joseph B. Gardner
his ATTORNEY

Patented Oct. 16, 1923.

1,471,168

UNITED STATES PATENT OFFICE.

BENJAMIN KATZ, OF OAKLAND, CALIFORNIA.

HEADREST FOR AUTOMOBILE SEATS AND THE LIKE.

Application filed February 24, 1921. Serial No. 447,368.

*To all whom it may concern:*

Be it known that I, BENJAMIN KATZ, a citizen of the United States, and a resident of Oakland, county of Alameda, and State of California, have invented a new and useful Headrest for Automobile Seats and the like, of which the following is a specification.

The invention relates to a removable head rest for use in connection with automobile seats, particularly the driver's seat.

An object of the invention is to provide a head rest which is yieldable in the particular directions that the head of the occupant of a moving vehicle, usually moves when subjected to the jolts and irregular movements of the vehicle.

Another object of the invention is to provide a head rest which may be adjusted to accommodate occupants of various statures.

A further object is to provide the seat with which the rest is associated, with means for removably supporting the rest, which will be practically invisible or at least very inconspicuous when the rest is removed.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to said drawings.

Almost invariably when a motorist drives his car continuously on a trip of any great length, the muscles of his neck tire due to the unrelaxed position necessarily maintained by the head. By providing a properly positioned head rest in connection with the driver's seat, he may rest his head, relax the tired neck muscles, and still maintain his alert vigil. Furthermore since as in the present form of the invention the head rest is readily yieldable in the directions in which the driver's body and head usually move during the jolting of the vehicle, the jarring and bumping of the head against the rest will be eliminated and the driver will be permitted to maintain a position of comparative ease and comfort.

Briefly summarized the head rest as here shown comprises a vertically adjustable standard removably supported on the back of the seat, a forwardly and rearwardly adjustable member carried by the standard, a spindle reciprocatively mounted in said member, an upholstered rest pivoted to the spindle for movement about a horizontal axis, means for resiliently holding the rest against rotative movement about its axis, and means for resiliently holding the spindle and the rest extended forwardly.

Figure 1:
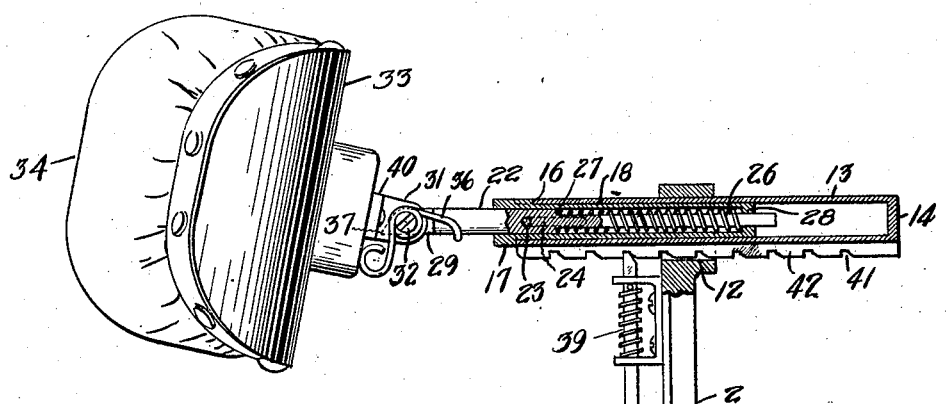
Figure 1 is a side elevation of the head rest of my invention showing it attached to the back of a seat, parts of the device being shown in section to disclose the hidden mechanism more clearly.

A detailed description follows:

The device comprises a substantially vertical standard 2 which is removably and slidably supported in a guideway 3 which as shown in Figure 1 is in the form of a flanged retaining plate 4 conveniently attached to the rear side of the back 6 of the seat 7. The standard is adjustable vertically and to this end it is preferably provided with spaced notches 8 which are arranged to be engaged by a spring pressed pawl 9.

Formed in the upper end of the standard 2 is an eye 12 in which engages a transversely movable casing or hollow member 13. One end 14 of the member 13 is closed whereas the other end 16 is open and is engaged by a shoulder 17 of a tube 18 which extends into the interior of the member. The tube 18 is preferably prevented from rotating with respect to the casing member by means of a key 19 which is formed on the tube and is arranged to engage the recess 21 provided at the open end 16 of the casing. In this manner the tube and casing may be either readily disengaged from each other or quickly secured in locked engagement. Reciprocatively mounted in the tube 18 is a spindle 22 which is provided with a transversely disposed pin 23 that engages in a slot 24 formed in the tube so that rotative movement of the spindle within the tube is prevented and the forward and rearward movement of the spindle limited. A portion of the enclosed section of the spindle is preferably reduced in area and is encircled by a coil spring 26 one end of which abuts against the shoulder 27 of the spindle and the other end abuts against the perforated inner end 28 of the tube, the spindle being thus normally held extended forwardly.

Pivotally secured to the exposed end 29 of the spindle by means of ears 31 which engage a pivot stud 32 is a head resting member or body 33 preferably upholstered in a suitable manner on its forward side 34. The axis of the stud 32 is horizontally disposed so that the rest 33 may be swung in a vertical plane. The rest is normally held in the extended substantially horizontal position shown in Figure 1, through the agency of a spring 36 which preferably encircles the pivot stud 32 and presses against the rest in a manner to resiliently resist the downward movement thereof, positive limitation to the downward movement of the rest being preferably effected when the base plate 35 of the ear bracket abuts against the nose 37 formed at the end 29 of the spindle.

From the foregoing it will be readily understood the head rest is yieldingly mounted both for horizontal and vertical movement. In this manner the head rest with comparatively small resistance will move with the head of the occupant during the usual jolting of the moving vehicle, and at the same time prove normally sufficiently rigid to comfortably support the head.

The head rest, and the spindle, tube, and casing, which latter members may be broadly termed an arm, are movable as a whole forwardly or rearwardly with respect to the occupant, and are preferably held in adjusted position by means of a spring pressed pawl 39 supported by the standard 2 and adapted to engage in notches 41 formed in the plate 42 fixed to the casing. It will thus be noted that the head rest is adjustable both forward and rearward and upward and downward, thereby permitting the device to be adjusted to accommodate any sized person. Furthermore it is apparent that the complete head rest may be readily removed if desired, and when this is done, the inobtrusive guide plate 4 is practically the only element which remains on the seat.

Figure 3:
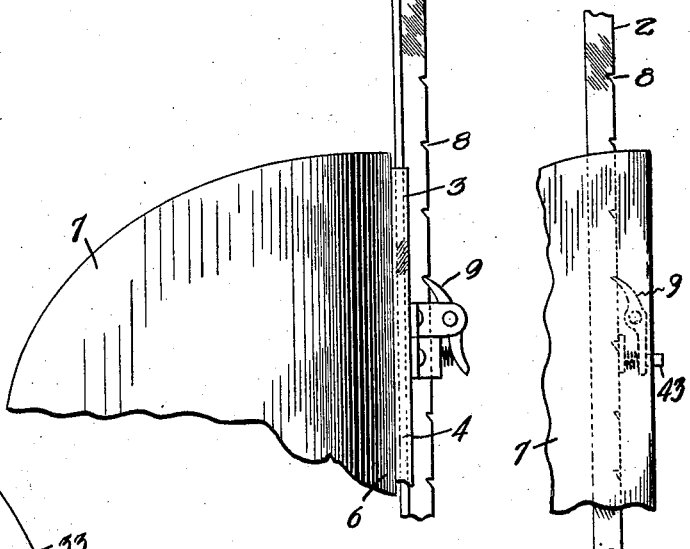
Figure 3 is a fragmentary side elevation of a modified form of support for the rest on the seat.
Figure 2:
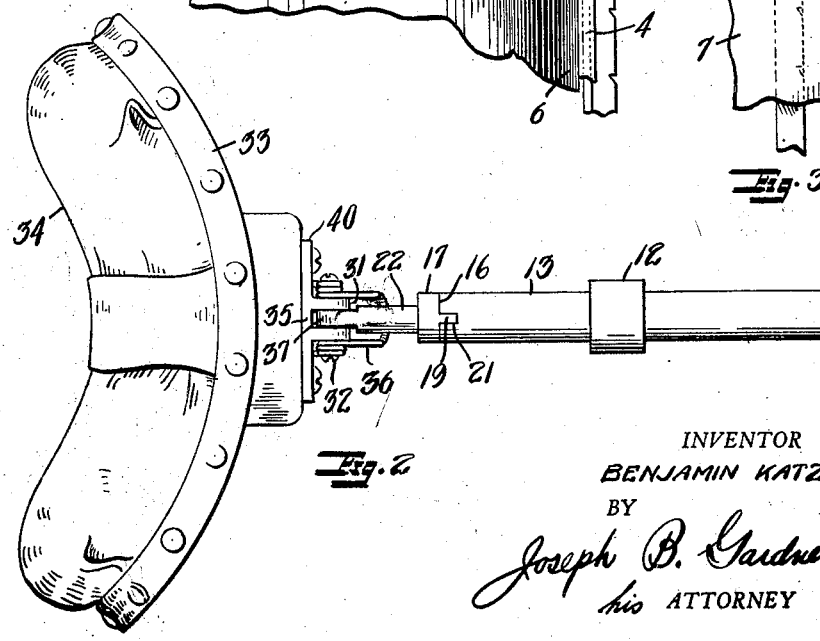
Figure 2 is a plan view of the rest.

In Figure 3 is shown a modified form of supporting the standard upon the back of the seat. In this embodiment the standard is arranged to slide in a guideway formed entirely within the structure comprising the back of the seat, the pawl 9 being manipulated when necessary by a button 43 which extends through the back. The foregoing construction is particularly advantageous since no supporting means for the head rest is visible on the back or seat when the former is removed.

I claim:

1. A head rest for automobile seats and the like, comprising a vertically adjustable standard, a transversely adjustable member mounted in said standard, a spring pressed reciprocative element supported by said member, and a rest carried by said element.

2. A head rest for automobile seats and the like, comprising a standard, a forwardly and rearwardly adjustable member mounted in said standard, a reciprocative element supported by said member, a spring adapted to hold said element in a forward position, and an upholstered rest carried by said reciprocative element.

3. A head rest for automobile seats or the like, comprising a vertically adjustable standard removably supported on the back of the seat, a forwardly and rearwardly adjustable member mounted in said standard, a spring pressed element reciprocatively mounted in said member and adapted to be normally held in a forward position, an upholstered body pivoted to said element, and means for resiliently holding said body against movement about its axis of rotation.

4. A head rest for automobile seats or the like, comprising a vertically adjustable standard adapted to be removably carried on the back of the seat, a forwardly and rearwardly adjustable hollow member mounted in said standard, a spindle having one end reciprocatively engaging in said hollow member, an upholstered rest pivoted to the other end of said spindle for movement about a horizontal axis, a spring arranged in said hollow member arranged to normally hold said spindle in extended relation, and a spring for holding said rest against movement about its axis of rotation.

In testimony whereof I have hereunto set my hand at Oakland, California, this 16th day of February, 1921.

BENJAMIN KATZ.